United States Patent [19]
Nettleton et al.

[11] Patent Number: 5,434,612
[45] Date of Patent: Jul. 18, 1995

[54] DUO-FRAME NORMALIZATION TECHNIQUE

[75] Inventors: John E. Nettleton, Fairfax Station; Dallas N. Barr, Woodbridge, both of Va.

[73] Assignee: The United States of America as represented by the Secretary of the Army, Washington, D.C.

[21] Appl. No.: 243,726

[22] Filed: May 17, 1994

Related U.S. Application Data

[63] Continuation-in-part of Ser. No. 950,511, Sep. 25, 1992, abandoned.

[51] Int. Cl.6 ............................................. H04N 7/18
[52] U.S. Cl. ............................................. 348/31
[58] Field of Search ..................... 348/31; H04N 7/18

[56] References Cited

U.S. PATENT DOCUMENTS

| | | | |
|---|---|---|---|
| 4,839,569 | 6/1989 | Dallin, II | 250/213 |
| 4,915,498 | 4/1990 | Malek | 358/95 |
| 5,013,917 | 5/1991 | Ulich | 358/95 |
| 5,056,914 | 10/1991 | Kollodge | 348/31 |

Primary Examiner—Howard W. Britton
Assistant Examiner—Vu Le
Attorney, Agent, or Firm—Milton W. Lee; Alain L. Bashore; Anthony T. Lane

[57] ABSTRACT

A duo-frame normalization technique and system for use in range gate imaging to determine a range coded image by use of two image frames. A transmitter emits a modulated energy pulse which is not gated when received by a single gated imaging camera to obtain an integrated first image frame and gated by the same camera when received as an integrated second image frame. The second integrated frame is divided by the first integrated frame to yield a range coded pixel intensity image. Three gated imagining cameras can also be used that share common imaging optics via filters and beam splitters so as to compensate for phenomenological issues that can vary the signals from one frame to another and lead to degraded range images.

1 Claim, 5 Drawing Sheets

DUO-FRAME NORMALIZATION TECHNIQUE

CROSS-REFERENCE TO RELATED APPLICATIONS

This application is a continuation-in-part of application Ser. No. 07/950,511 filed 25 Sep. 1992 now abandoned.

BACKGROUND OF THE INVENTION

1. Field of the Invention

The present invention generally relates to range gate imaging and more specifically, to a duo-frame normalization technique and system for use in range gate imaging to determine a range coded image.

2. Description of Prior Art

Range gate imaging involves sending out a narrow light pulse or train of pulses that is received by gating a receiver open and closed at a desired moment. The time to gate the receiver is determined by the round trip time the light pulse(s) must travel to return from the range being imaged. When the light pulse(s) from the desired range has returned to the receiver the receiver is shuttered to allow just that pulse in. This technique has been utilized as a method to negate low visibility atmospheric effects so as to determine the range of a target and to produce a composite range coded image for an entire range so as to aid in identification of a target.

Light-scattering particles present in an atmosphere can completely swamp the returning signal such that the resulting image does not convey useful information. By gating the signal, light which returns from objects or atmospheric scatters closer or farther away than the predetermined range is thus rejected. A range coded image for an entire range can also be derived from gating range imaging so as to identify what is the object of interest. A single imaging frame represents one range bin where the range width/precision of the bin is determined by the pulse width and receiver shutter speed (the receiver is usually gated for a time equal to the pulse width). To provide adequate range coverage of a scene many frames are required. For example, to provide range coverage from 50 to 500 meters with 5 meter wide range bins, it would require at least 90 frames which translate into a total of 3 seconds for a system with a 30 hertz frame rate. This lengthy acquisition time severely limits the real time utility of conventional range gate imaging.

Sequential image collection is also subject to frame to frame fluctuations due to phenomenological issues including those associated with: atmospheric turbulence, speckle, laser mode stability and platform motion (jitter). Atmospheric turbulence can significantly change the spatial distribution of energy in a laser beam. Refractive index variations along the laser propagation path thereby lead to an interference pattern of randomly distributed bright and dark regions in the beam at some distance from the laser. Another interference pattern results at the receiver due to reflection of radiation from a rough surface as each point on the surface reflects with a random phase shift. A speckle pattern thus often is seen as a grainy structure in laser based photography. Further not all lasers produce the same beam distribution every time they are fired. Multi-mode lasers can have significantly different beam profiles from one pulse to another, thus the variation will also degrade the processed range image of a sensor. Platform motion can change the registration of pixels on the target from one frame to the next. Even sub-pixel motion can adversely affect the quality of the processed image.

While the prior art has reported using range gate imaging none have established a basis for a specific apparatus that is dedicated to the task of resolving the particular problem at hand. What is needed in this instance is a new technique to obtain a range coded image by range gating imaging with a short acquisition time. A new technique to obtain a range coded image by range gating imaging is also needed that substantially compensates for phenomenlogical issues.

SUMMARY OF THE INVENTION

It is therefore an object of the invention to provide a technique utilized in range-gated imaging to obtain a range code image within a short acquisition time.

It is another object of the invention to provide a technique utilized in range-gated imaging to obtain a range code image within a short acquisition time further including substantial compensation for phenomenological issues.

According to the invention, this new technique utilizes only two images, which may be collected simultaneously, to provide adequate range coverage of a scene. The first image is a standard reflectance image of the scene where the brightness of each pixel depends on the beam intensity on the target, the target reflectance and the atmospheric propagation effects. The brightness of each pixel in the second image contains the same information as the first but has the additional factor of range dependence due to a gated or modulation step. The received energy is the result of the integration of the transmitted pulse and the return reflected energy sensed by a gated receiver. The pixel intensities resulting from the integrated received energy of the second image is divided by the pixel intensities of the first image. The result obtained is range dependent pixels that may be utilized for a range-coded image where the intensity of each pixel corresponds to the range of that pixel.

Phenomenological issues can vary the resultant signals from one frame to another which leads to degraded range images. A second embodiment is disclosed that utilizes the collection of all necessary data simultaneously. Three gated imagining cameras share common imaging optics via filters and beam splitters. A laser blocking and bandpass filter rejects a reflected laser signal but selects an adjacent narrow band of radiation to serve as the ambient light signal that is gated by a gated intensifier, also described as a "long gate". A "long gate" is applied to the ambient camera to obtain maximum signal to noise ratio. The reflected laser signal is then split in equal parts for the long and short gated image intensifiers. Images are processed by a signal processor to produce the desired range image.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
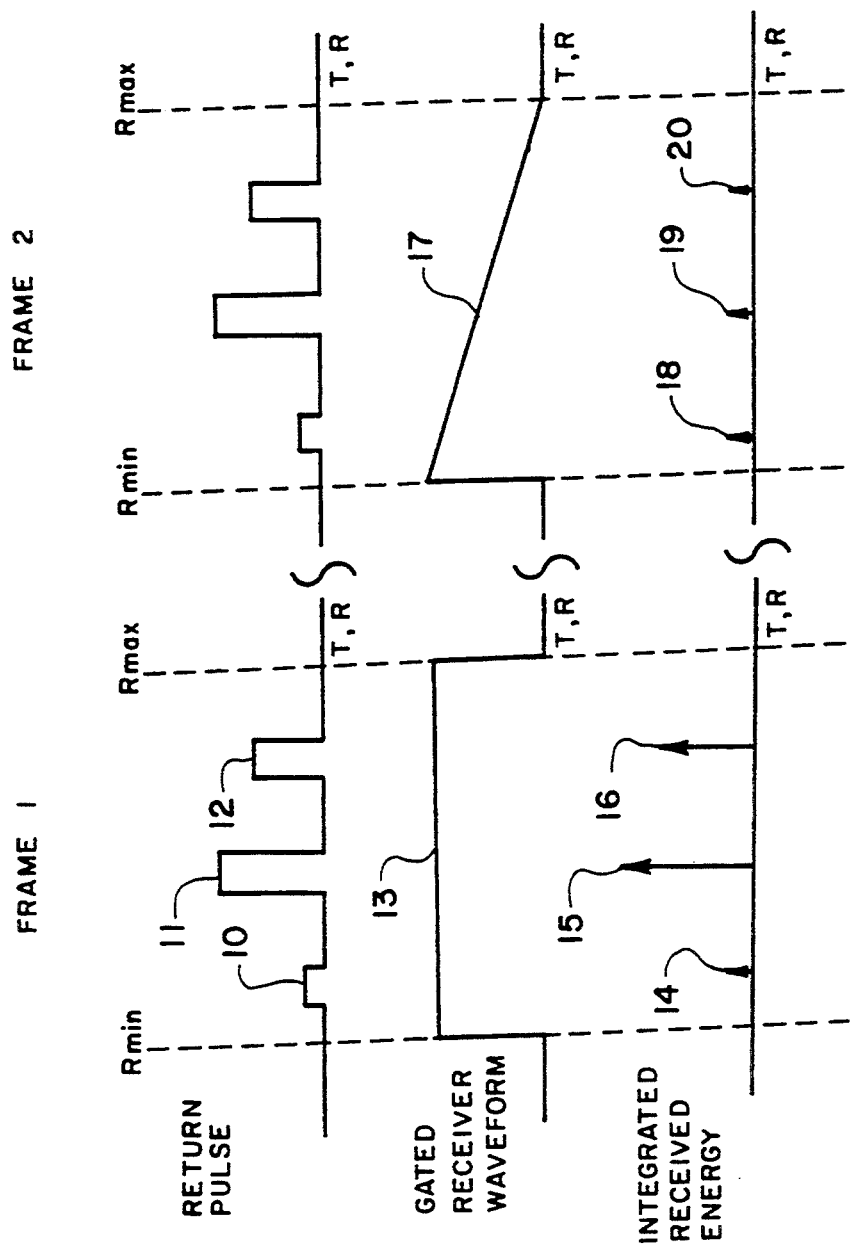
FIG. 1 is a graphical representation of the integration technique utilized.

Referring now to the drawings, and more particularly to FIG. 1, there is shown a graphical representation of the steps involved in the duo-frame normalization technique which utilizes a short pulse with ramped gate as a first example of this technique. This example is effective for solid state lasers. The transmitted pulses yields a return shown for frame one which consist of narrow pixels 10, 11, and 12 which represents three different pixels on the faceplate of an image intensifier device. The different pulse amplitudes show different reflectance and range effects on the return reflected energy from a target of interest over a specific integration time determined by a gated receiver. Pixel 10 represents a close, low reflectant target; pixel 11 represents a medium range, high reflectant target; and pixel 12 represents a distant, medium reflectant target. It is understood that the invention is not limited to the number of pulses to be used.

Gate waveform 13 which is uniform over the entire integration time, is switched on at a specified minimum range (R min) and switched off at a maximum range (R max) to truncate more distant returns and reduce dark current noise integration. The integrated received energy represented as intensities 14,15, and 16 are the product of the transmitted pulses and the gate waveform. Frame two utilizes the same transmitted pluses as frame one, but gate waveform 17 is a linear ramp as a non-uniform waveform which descends to R max. This gate waveform controls the gain of the image intensifier device and is therefore a time dependent multiplier of the pulse energy. Intensities 18, 19, and 20 are the product of the transmitted pulse and gate waveform 17 for frame two.

Figure 2:
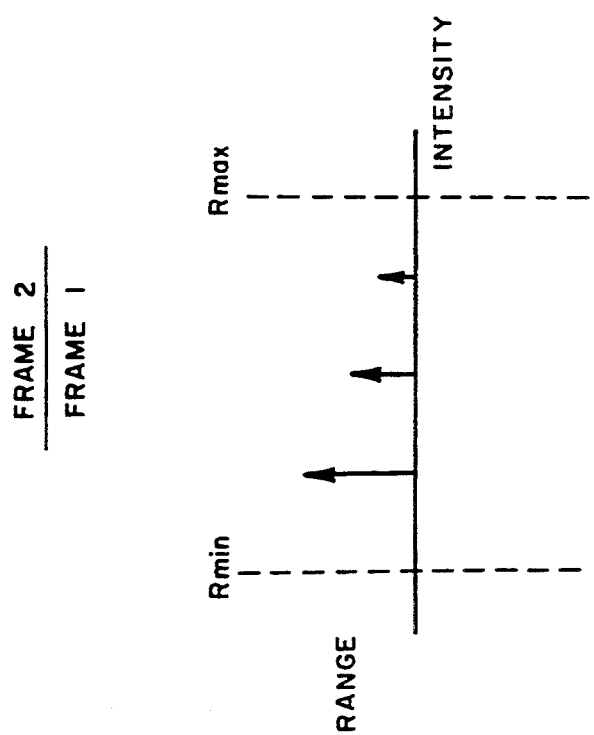
FIG. 2 is a graphical representation of the frame division technique for FIG. 1.

The two frames are digitized then normalized by frame division in a processor and the results are shown in FIG. 2. Pixel intensities are determined by dividing the intensity of each pixel in frame two by the corresponding intensity in frame one. With multiple pixels there is produced a range-coded image where the intensity of each pixel corresponds to the range of that pixel.

Figure 4:
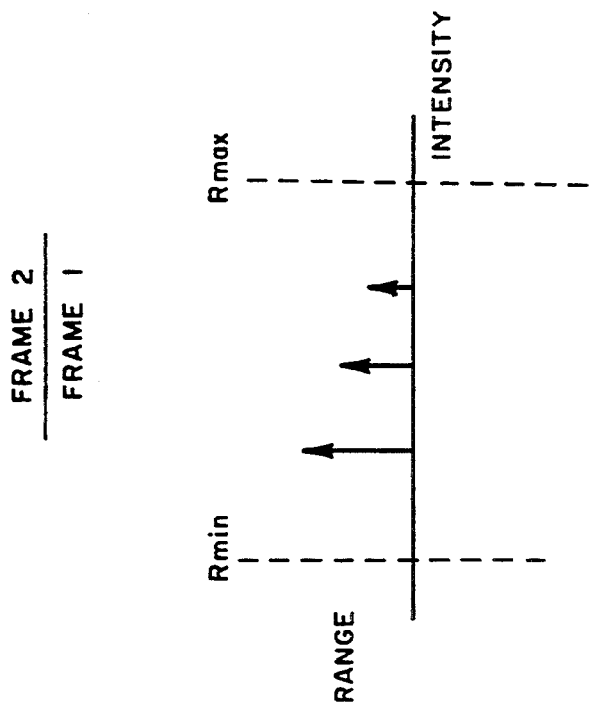
FIG. 4 is a graphical representation of the frame division technique for FIG. 3.
Figure 3:
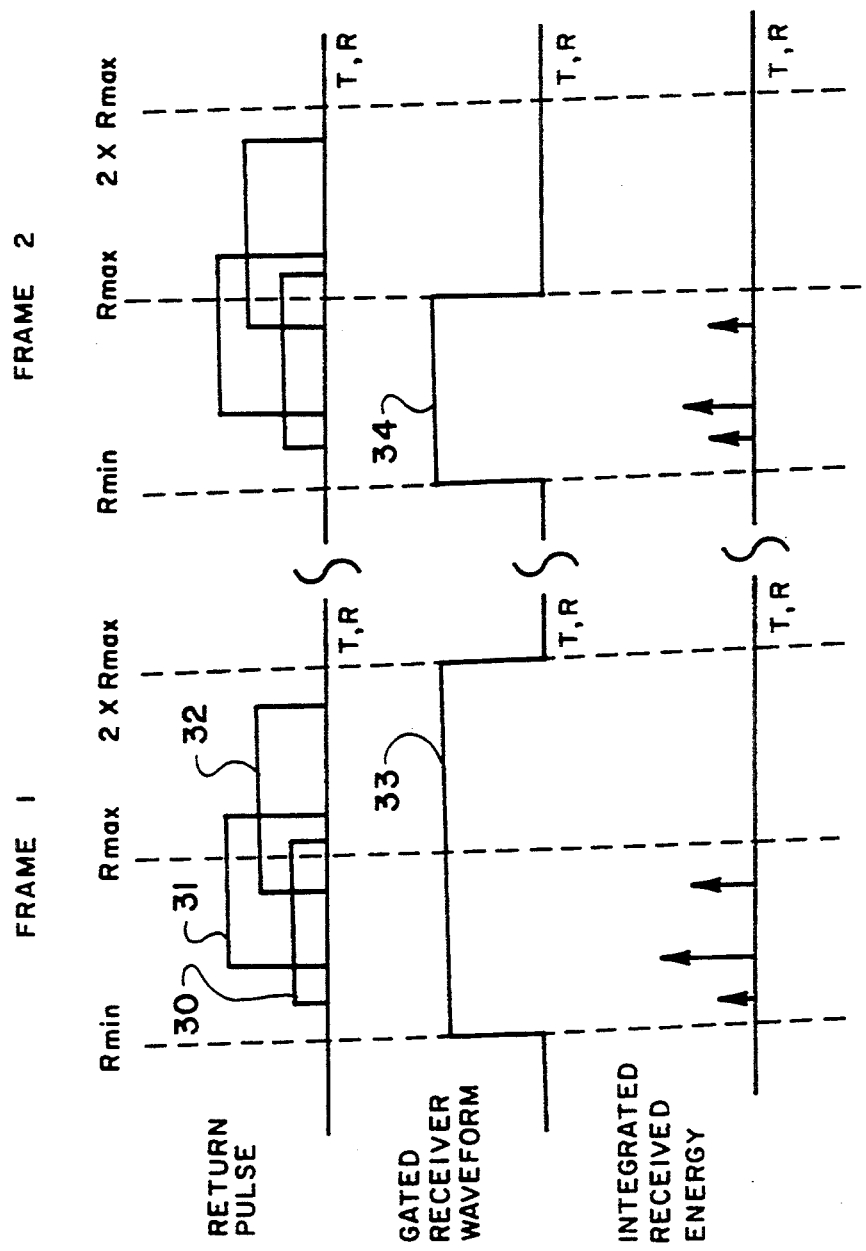
FIG. 3 is a graphical representation of the integration technique utilized in an alternative embodiment.

FIG. 3 shows the graphical representation for the duo-normalization technique utilizing a transmitted long pulse with truncated gate as a second example of the use of this technique. This example is effective for quasi- CW laser sources such as diode lasers, which cannot easily produce high peak powers. The transmitted long pulse yields a return which includes pixels 30, 31, and 32 transmitted over the range of two times R max in frame 1, which is similar for frame 2. Frame 1 gate waveform, described as "long gate", is shown as gate waveform 33 which has a duration of two times R max. For frame 2 there is shown as a uniform waveform, described as "short gate", with a gate waveform 34 which has a duration of R max. All of the optical pulse duration is accepted in frame 1 but in frame 2 it is truncated at R max limiting the integration time of more distant targets. The received energy is the integral of the transmitted pulses and corresponding gated receiver. FIG. 4 shows the resultant pixel image intensity data used for the range image, which is the ratio of frame 2 to frame 1 as described in the first example.

It is understood that the invention is not limited to the particular type of transmitted pulse, truncation limits, or gate/waveform described above. Any type of combination may be used to achieve the desired result for a particular set of conditions. For example, a gate waveform as an increasing ramp would give greater gain to the more distant pixels, which may be needed in weak signal conditions. Other nonuniform waveforms may be used to compensate for nonlinearities in the sensing device.

Figure 5:
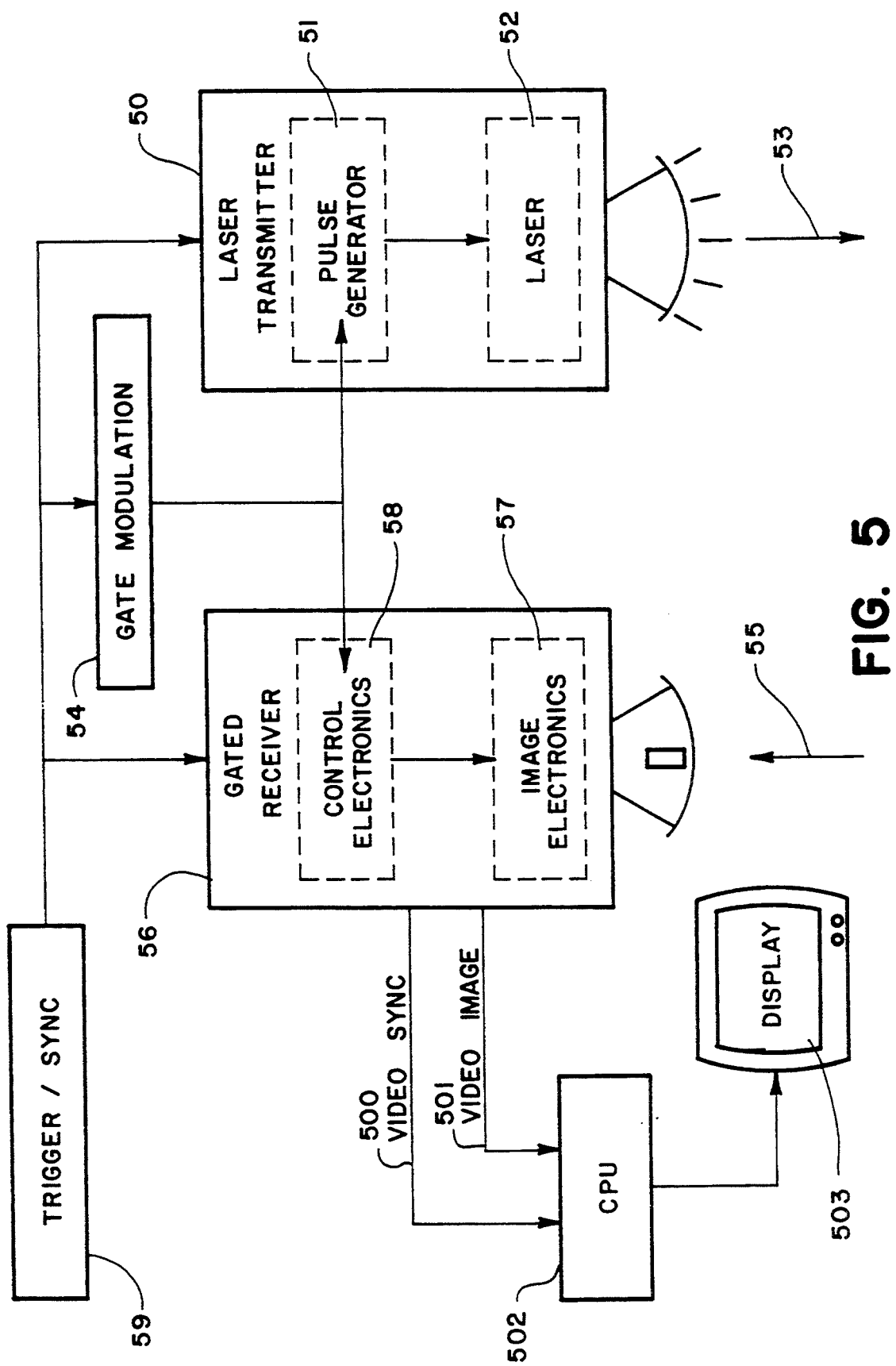
FIG. 5 is a block diagram of the system as a first embodiment.

FIG. 5 depicts the block diagram for the system as the first embodiment. Laser transmitter 50 which includes pulse generator 51 and laser 52 emits pulse 53 with a pulse modulation determined by modulator 54. Pulse 55 is received from a target by gated receiver 56 consisting of an image intensifier 57 and control electronics 58. Control electronics 58 gates received pulse 55 according to the particular gate waveform determined by modulator 54. Trigger/sync 59 determines the R max, R min and time intervals for frame rates and intervals. Both video sync 500 and video image 501 is imputed into CPU 502 which performs the frame division and display results on display 503. It is understood that high speed repetition of the technique can be performed to produce video rate range coded imagery.

An image intensifier device utilizing a phosphor screen pixel area of approximately 40 microns with a screen of 18 mm (18,000 microns) can be utilized in the first embodiment. With such a device the present invention could result in a device equivalent to approximately 200,000 rangefinders working simultaneously. For a 25 mm tube, the equivalent of approximately 380,000 rangefinders can be achieved. Near video frame rates can be achieved with current image intensifier devices and high speed image procecessors. Thus a 30 Hertz range imagery can now be collected at a rate of 11 million pixels per second.

The first embodiment depicted in FIG. 5 utilizes a single gated imaging receiver which is used to collect two frames of data. The data images are then processed to form an intensity coded range image. Two separate laser pulses are used which are separated in time by perhaps 1/30th of a second. Excellent correlation of the two images in terms of time dependent atmospheric distortions, laser signal and image registration is difficult. Phenomenological issues such as those discussed in the Prior Art can vary the signals from one frame to another and which lead to degraded range images.

Figure 6:
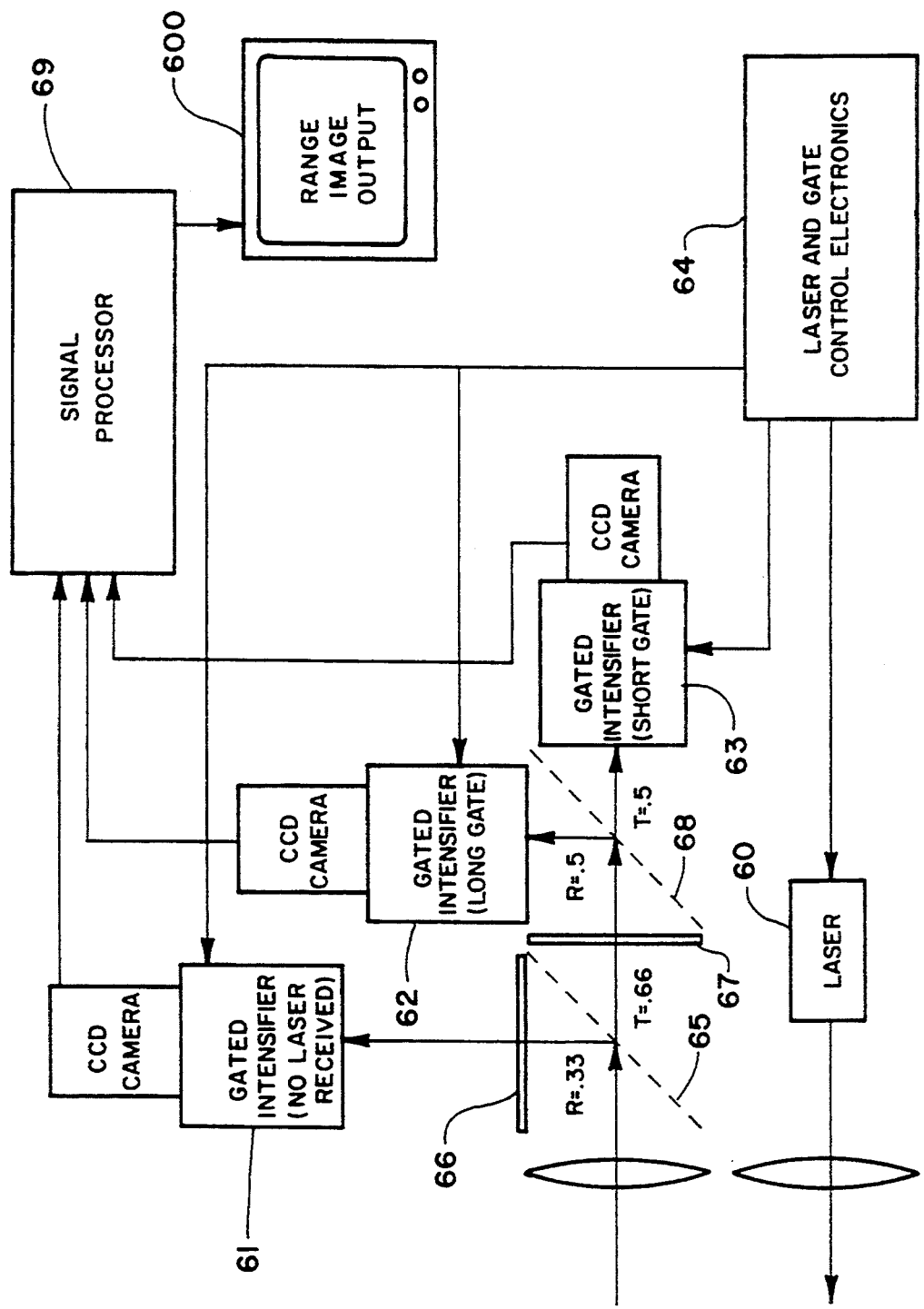
FIG. 6 is a block diagram of the system as a second embodiment.

FIG. 6 depicts a block diagram of the system as a second embodiment utilizing the collection of all necessary data simultaneously. Laser 60 transmits a single pulse to illuminate a scene. Three gated imagining cameras, 61, 62, and 63 (each including a gated intensifier and CCD camera) are mounted on a plate and share common imaging optics via filters and beam splitters. Laser and gate control electronics 64 activate gated intensifiers 62 and 63 as described previously for FIGS. 1–5. Returning radiation is split in a 33/66 ratio by beam splitter 65. This optic could also be a dichroic splitter which would transmit a laser wavelength and reflect other wavelengths. Laser blocking and bandpass filter 66 rejects the laser signal but selects an adjacent narrow band of radiation to serve as the ambient light signal that is gated by gated intensifier 61, also described as a "long gate". A "long gate" is applied to the ambient camera to obtain maximum signal to noise ratio. The radiation transmitted by the first beam splitter 65 is bandpass filtered with band pass filter 67 at the laser wavelength and split by beam splitter 68 in equal parts for long and short gated image intensifiers 62 and 63. The ambient image is normalized and subtracted from the long and short gate laser images in processor 69, well known in the prior art, to remove any effects due to background radiation. The resultant output may be viewed on output 600.

The second embodiment, as described above includes the advantage that all images are obtained simultaneously and in a time that is relatively short as compared to dynamic scene effects such as turbulence, speckle and jitter. Also, since only one laser pulse is used, the shot-to-shot modal variations of multi-mode lasers are inconsequential. With both embodiments there is significant advancement in the art, resulting in a real time range coded imagery is achieved utilizing range-gate imaging, and further to include compensation for phenomenolgical effects.

While this invention has been described in terms of preferred embodiment consisting of the specific examples utilizing the duo-frame normalization technique and system, those skilled in the art will recognize that the invention can be practiced with modification within the spirit and scope of the appended claims.

Having thus described my invention, what we claim as new and desire to secure by Letters Patent is as follows:

1. A duo-frame normalization technique for use in range gate imaging to compensate for phenomenological effects, including the steps of:

generating an energy pulse;

transmitting over a range interval the energy pulse to a target;

simultaneously receiving,
   a) ambient light present over an open gated range as an integrated ambient image;
   b) a reflected energy pulse from said target over the open-gated range as an integrated first gate image;
   c) the reflected energy pulse from said target over a shortened gate range as an integrated second gate image;

normalizing the integrated ambient image;

subtracting the integrated normalized ambient image from both the integrated first gate image and the integrated second gate image, to yield a first and second frame integration;

dividing the second frame integration by the first frame integration whereby a range-coded image is obtained in a time that is relatively short as compared to dynamic scene effects so as to substantially remove all dynamic scene effects from the range-coded image.

* * * * *